United States Patent Office 3,347,803
Patented Oct. 17, 1967

3,347,803
PROCESS FOR THE PRODUCTION OF HARDENABLE SYNTHETIC RESINOUS PRODUCTS CONTAINING HALOHYDRIN GROUPS
Herbert Frotscher, Langenfeld, Rhineland, and Manfred Petzold, Dusseldorf-Holthausen, Germany, assignors to Bohme Fettchemie G.m.b.H., Dusseldorf, Germany, a corporation of Germany
No Drawing. Filed May 13, 1965, Ser. No. 455,611
Claims priority, application Germany, Jan. 16, 1959, B 51,757; Mar. 5, 1959, B 52,370; Feb. 27, 1960, B 56,853
6 Claims. (Cl. 260—2)

ABSTRACT OF THE DISCLOSURE

Hardenable, water-soluble synthetic resinous products containing 1,2-epoxide and/or halohydrin groups, process for their preparation and use of said products for providing antistatic finishes on synthetic organic materials.

This application is a continuation-in-part of previous applications Ser. No. 836,063, filed Aug. 26, 1959, and Ser. No. 91,333, filed Feb. 24, 1961, both now abandoned.

This invention relates to the production of readily hardenable synthetic resins which have good electrical conductivity, and to the use of such resins as antistatic coatings for various objects of both natural and synthetic materials.

We have found that novel, technically valuable, hardenable synthetics are obtained by reacting water-soluble polyamines containing polyalkyleneoxide radicals on the nitrogen atoms with compounds which contain more than one epoxide and/or halohydrin group in the molecule. These synthetics have a highly viscous to paste-like or also solid consistency and are characterized in that they are relatively rapidly, and readily hardenable at temperatures below 100° C., or even at room temperature. They are further characterized in that, both in the partially condensed and completely condensed state, they have the property of not accumulating electrostatic charges; that is, they possess a remarkable electric conductivity. The products can be obtained in a partially condensed state with good storage stability.

The water-soluble polyamines containing polyalkyleneoxide radicals, which are used as starting materials in this process, are essentially known substances and may be obtained in accordance with known methods. For example, they may be prepared by reacting mono- and/or polyfunctional derivatives of polyalkylene oxides, which contain reactive groups capable of reacting with amino groups by an exchange of hydrogen atoms, with polyamines, or ammonia, or mixtures of polyamines and ammonia.

The compounds used as the second starting component, that is the compounds which contain more than one epoxide and/or halohydrin group in the molecule, include primarily epichlorohydrin and dichlorohydrins as well as their reactive reaction products which contain more than one epoxide and/or halohydrin group in the molecule.

Examples of mono- and/or poly-functional derivatives of polyalkylene oxides of the above-indicated type are those derivatives of polyalkylene oxides which contain, as reactive groups, chlorohydrin radicals, glycidyl radicals, halogen or other radicals capable of forming anions, such as sulfuric acid radicals, alkylsulfonic acid radicals and the like. The polyalkyleneoxide groups present in these compounds may be of various molecular size, but, in general, the starting materials are selected so that a total of about 3 to 70 alkyleneoxide radicals are present in the molecule. Ethyleneoxide is primarily suitable as an alkyleneoxide; however, other cyclic oxides, such as propyleneoxide or cyclohexaneoxide as well as corresponding mixtures, may also be used. The alkyleneoxide chains may also be interrupted, for example, by a dicarboxylic or diisocyanate radical.

Accordingly, examples of compounds which may be used as starting materials for the preparation of the substituted polyamines, and by the radicals of which the polyamines are characterized, are the following:

Mono- and bis-chlorohydrin ethers of polyalkyleneoxides,
Mono- and bis-glycidyl ethers of polyalkyleneoxides,
Bis-sulfuric acid esters of polyalkyleneoxides,
Dihalides of polyalkylene oxides,
Oxalkylation products of ethylenechlorohydrin,
Mono-, di- and tri-halides of oxethylated glycerin,
Mono-, di-, tri- and tetra-halides of oxethylated pentaerythrite,
Monochlorohydrin ethers of oxalkylated alcohols,
Monoglycidyl ethers of oxyalkylated alcohols,
Reaction products formed by oxethylated ethylenechlorohydrin and a diisocyanate,
Reaction products of oxethylated ethylenechlorohydrin and dicarboxylic acid or its anhydride.

For the preparation of the starting materials, these compounds are condensed with polyamines which contain at least two nitrogen groups in the molecule. For this purpose, polyalkylene polyamines are preferred, but other polyamines, such as those of an aromatic nature, may also be used. Examples of such amines are the following: ethylene diamine, diethylene triamine, dipropylene triamine, triethylene tetraamine, 1,4-phenylene diamine, 1,4-diamino cyclohexane and the like. Instead of the polyamines ammonia or mixtures of ammonia and polyamines can be used.

Polyalkoxylated polyamines which are derived from dipropylene triamine have been found to be particularly suitable because they produce light-stable synthetics which are light in color.

As already mentioned, the reaction of the abovementioned starting components for the formation of the polyalkoxylated polyamines used as starting materials is effected in accordance with known methods. In order to obtain products which are particularly suitable for the process according to the invention, the quantitative ratios of the starting materials, the chain length and the reaction conditions are preferably selected so that products are obtained which are readily water-soluble, which may be achieved without difficulty by variation of the length of the polyalkyleneoxide chains and of the amine component. It is important that the quantities of the polyamines be such that after the completed reaction the polyalkyleneoxylated polyamines contain a sufficient number of reactive amino groups which are capable of reaction with epichlorohydrin or dichlorohydrin or with the compounds containing epoxide and/or halohydrin groups.

As already mentioned, primarily epichlorohydrin and dichlorohydrins are used as the compounds which contain more than one epoxide and/or halohydrin group in the molecule. However, reaction products of these compounds which still contain reactive epoxide or halohydrin groups, such as reactive products of epichlorohydrin or dichlorohydrin with glycols, diglycols, polyalkyleneoxides, glycerin, dicarboxylic acids, polycarboxylic acids, polyvalent phenols and the like, may also be used with advantage.

The reaction of these compounds with the alkylene oxylated polyamines proceeds smoothly. It may be carried out without or in the presence of organic solvents or water as well as acid-binding substances, for example, alkali metal hydroxides such as caustic soda, alkali metal carbonates and bicarbonates, such as sodium or potassium carbonate or bicarbonate, and alkaline earth metal carbonates, such as magnesium carbonate and the like.

In accordance with a preferred embodiment of the process according to the invention, the polyalkylene oxylated polyamines selected as starting materials are those which are obtained by condensation of polyamines or ammonia with polyalkyleneoxide derivatives which contain chlorohydrin and/or epoxide groups, the mono- and bis-chlorohydrin ethers of polyalkyleneoxides and mixtures thereof being particularly preferred.

In this case, the synthetic materials according to the invention may be produced in a single process, without isolation of intermediate products, from polyalkylene oxides or their mono-substitution products. For example, it is possible to transform a polyethylene glycol having a molecular weight of about 400 to 2000 into mono- or bis-chlorohydrin ethers of the polyglycol in a well known manner with epichlorohydrin in the presence of a customary catalyst, such as boron trifluoride. The reaction mixture can then be reacted directly with a polyamine, such as tripropylene tetra-amine or ammonia, possibly with an intermediate transformation of the chlorohydrin group into an epoxide group, whereby chlorohydrates of more or less polymeric polyglycol-polyamines are formed. The polymeric character of these compounds is determined on the one hand by the ratio of chlorohydrin groups to amino groups and on the other hand by the ratio of monochlorohydrin ether to bis-chlorohydrin ether radicals, as they are present in the starting mixture, and depends upon the reaction temperature and time.

The reaction may be carried out in the presence of any desired solvent, such as dioxan, alcohols and the like, but they are not absolutely required. Water is primarily suitable for this purpose. Furthermore, in order to accelerate the reaction, acid-binding substances such as sodium hydroxide, potassium hydroxide, sodium carbonate or triethanolamine, preferably in aqueous solution, may be added to the reaction mixture at any desired time.

In this procedure it is not always necessary to continue the reaction until all of the organic chlorine is transformed into ionic chlorine. In many cases, it is sufficient if more than one mol organically-bonded chlorine is transformed into ionically-bonded chlorine for each mol of polyglycol used in the reaction.

For the production of the hardenable end products, epichlorohydrin and/or dichlorohydrin and/or one additional compound containing more than one epoxide or halohydrin group are added to the polyalkoxylated polyamines and the reaction is continued at temperatures between 50 to 100° C., preferably in the presence of water, until a distinct increase in the viscosity of the reaction product occurs. The optimum quantity of the halohydrin or epoxide compounds may be varied within wide limits and may be determined from one case to another depending upon the desired properties of the end product. It may be necessary to accelerate the reaction by the addition of a small amount of alkali, particularly in those cases where no increase in the viscosity occurs. At the end of the reaction the pH value of the product should be between 7 and 7.5. The reaction may be interrupted by adjusting the pH value to less than 6.

As previously indicated, the process can be conducted by using ammonia or ammonium salts in the presence of an alkali as well as the polyamines, or also mixtures of ammonia or ammonium salts with polyamines. For example, a polyglycol-bis-chlorohydrin ether may be reacted with a quantity of ammonia or a mixture of ammonia and dipropylenetriamine, for instance, such that after consumption of the hydrin-chlorine, free nitrogen-bonded hydrogen atoms still remain in the reaction product, and reacting the polyglycol polyamine thus obtained with epichlorohydrin, dichlorohydrin, or any other desired compound which contains more than one halogenhydrin and/or epoxide group in the molecule.

However, in order to obtain the products according to the invention, it is also possible to react polyalkylene oxide derivatives which contain more than one halogenhydrin group in the molecule, such as polyalkyleneoxide-chlorohydrin ethers or chlorohydrin ethers of oxalkylated polyvalent alcohols, in a single reaction step with polyamines or aqueous ammonia or with a mixture of ammonia and polyamines, if the molecular ratios are selected such that the number of halogenhydrin groups present to the number of hydrogen atoms attached to the ammonia or amine nitrogen is 4:5 to 7:5. Any loss in ammonia which may possibly occur in the production is not taken into consideration in this ratio. The aqueous ammonia may also be replaced by an aqueous solution of any desired ammonium salt, the amount of alkali equivalent to the acid radical of the ammonium salt being added at any desired point during the reaction.

More specifically, in the inventive process polyoxyethylenepolyamines, containing reactive hydrogen atoms bound to nitrogen, are reacted with compounds which contain more than one epoxide and/or halohydrin group in the molecule, in such mol-ratio—eventually in the presence of predetermined amounts of acid acceptors—that uniform, storage-stable, water-soluble products of precondensation are obtained, which still contain reactive, nitrogen-bounded hydrogen atoms, and on the other hand contain 1,2-epoxide and/or halohydrin groups. The latter may be regarded as potential epoxide-groups as they are easily transformed into such by addition of acid-acceptors (alkali). The thus obtained products of precondensation have the following advantages:

(a) The products represent uniform compounds, which contain all of the combined functional groups needed for the continued cross-linking, but which need not be used as multicomponent-system in the treatment bath. This characteristic renders possible, besides employment in the padding process, also such employment in the exhaustion method, because the entire pre-formed marcomolecule is applied uniformly with the reactive group needed for the cross-linking of the residue.

(b) According to the inventive process claimed, only mild fixation conditions are required due to greater reactivity of the epoxide-groups or of the halohydrin-groups effective as potential epoxide-groups. Furthermore, part of the cross-linking process has already been accomplished in the products of the present application, whereby the conditions for the hardening on the textile material are still further modified, so that the hardening process can start already at ambient temperature. This means in any case the protection of the material to be finished and a simplification of the working method.

For further clarification of the reactions a few short formulations are given as follows describing the preparation of the starting material and the obtaining of the final product of the invention:

(Ia) Method for the preparation of a polyglycolpolyamine starting material from polyglycoldichloride and polyalkylenepolyamine:

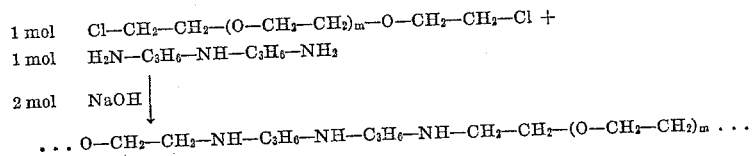

(Ib) Method for the preparation of a polyglycolpolyamine starting material by reaction of a polyglycol-bis-chlorohydrin ether with a polyalkylene amine:

1 mol   Cl—CH$_2$—CHOH—CH$_2$—(O—CH$_2$—CH$_2$)$_n$—O—CH$_2$—CHOH—CH$_2$Cl 1 mol   H$_2$N—C$_3$H$_6$—NH—C$_3$H$_6$—NH$_2$ 2 mol   NaOH ... O—CH$_2$—CHOH—CH$_2$—NH—C$_3$H$_6$—NH—C$_3$H$_6$—NH—CH$_2$—CHOH—CH$_2$—(O—CH$_2$—CH$_2$)$_n$ ...

(Ic) Method for the preparation of a polyglycolpolyamine starting material by reaction of a polyglycol-bis-chlorohydrin ether with ammonia:

1 mol   Cl—CH$_2$—CHOH—CH$_2$—(O—CH$_2$—CH$_2$)$_n$—O—CH$_2$—CHOH—CH$_2$Cl 1 mol   NH$_3$ 2 mol   NaOH ... OCH$_2$—CHOH—CH$_2$—NH—CH$_2$—CHOH—CH$_2$—(OCH$_2$—CH$_2$)$_n$—OCH$_2$—CHOH—CH$_2$NH—CH$_2$—CHOH ...

In all the cases Ia, Ib and Ic the polyglycolpolyamines contain reactive, nitrogen-bonded hydrogen atoms, but no epoxide or chlorohydrin groups. Consequently they are not capable of hardening without the aid of other agents.

(II) Preparation of a polyoxyethylenepolyamine-precondensation product containing reactive nitrogen-bonded hydrogen atoms and epoxide groups or halohydrin groups forming epoxide groups, this product being capable of self-hardening with the addition of alkali. The product is the invention of the present application.

1 mol   O—CH$_2$—CHOH—CH$_2$—NH—C$_3$H$_6$—NH—C$_3$H$_6$—NH—CH$_2$—CH—OH—CH$_2$—(O—CH$_2$—CH$_2$)$_n$ +1.5 mol   X—R—X;

X=—CH$_2$—CHOH—CH$_2$—Hal or

—CH$_2$—CH——CH$_2$
         \\  /
          O

The first reactant corresponds to the final product in reactions Ia and Ib.

The precondensation occurs in the presence of alkali; the reaction interruption occurs by addition of acid. Hardening can be accomplished by making the resinous solution alkaline again.

(III) Preparation of a polyoxyethylenepolyamine-precondensation product by reaction of 1 mol of polyglycol-bis-chlorohydrin ether with 1 mol of triamine to a polyoxyethylenepolyamine, containing neither chlorohydrin-nor epoxide-groups, and reaction of this compound with more polyglycol-bis-chlorohydrin ether of the same combination to water-soluble, hardenable pre-condensation products, containing nitrogen-bonded reactive hydrogen as well as the chlorohydrin groups necessary for the cross-linking.

1 mol   Cl—CH$_2$—CHOH—CH$_2$—(O—CH$_2$—CH$_2$)$_n$—O—CH$_2$—CHOH—CH$_2$—Cl 1 mol   H$_2$N—C$_3$H$_6$—NH—C$_3$H$_6$—NH$_2$ 2 mol   NaOH ... O—CH$_2$—CH—CHOH—CH$_2$—NH—C$_3$H$_6$—NH—C$_3$H$_6$—NH—CH$_2$—CHOH—CH$_2$—(O—CH$_2$—CH)$_n$ +1.5 mol   Cl—CH$_2$—CHOH—CH$_2$—(O—CH$_2$—CH$_2$)$_n$—O—CH$_2$—CHOH—CH$_2$—Cl The pre-condensation occurs in the presence of alkali; the reaction interruption occurs by addition of acid.

As the reaction proceeds intermediately through epoxide groups, which are formed in the presence of alkali, the obtained products may contain besides chlorohydrin groups also epoxide groups, in case the stabilization of the products is done not with hydrogen chloride, but for instance with acetic acid.

(IV) Preparation of water-soluble, hardenable condensation products corresponding with the preceding Method III, according to Examples XII, XXVIIII and XXIX.

(a) 2.5 mol   Cl—CH$_2$—CHOH—CH$_2$—(O—CH$_2$—CH$_2$)$_n$—O—CH$_2$—CHOH—CH$_2$—Cl 1 mol   H$_2$N—C$_3$H$_6$—NH—C$_3$H$_6$—NH$_2$ (b) 1.5 mol   Cl—CH$_2$—CHOH—CH$_2$—(O—CH$_2$—CH$_2$)$_n$—O—CH$_2$—CHOH—CH$_2$—Cl 1 mol   NH$_3$ The reaction and pre-condensation occur in the presence of alkali; the interruption of reaction occurs by addition of acid.

The molar ratio need not correspond with the ratios exactly as given in the above formula, the ratio of chlorine atoms to the nitrogen-bonded hydrogen atoms may amount according to the claim to 4:5 to 7:5. By preserving these ratios a cross-linking of the products obtained to get insoluble compounds is guaranteed. In the given example the over-all ratio of chlorine atoms to the nitrogen-bonded hydrogen atoms is the same as in Method III. The bis-chlorohydrin ether amount as needed for the second step in Method III is kept, to a certain degree from the start, in reserve in the reaction mixture.

The hardenable synthetics obtained by this process may be employed for the customary uses to which such hardenable materials are put today. To the extent that they are capable of deformation, they can be worked in customary fashion into shaped objects of all types prior to hardening. If they are in a state in which they are not capable of deformation, the products may be obtained in the form of solutions or dispersions for example in aqueous form, and they may in that form be allowed to gelatinize by hardening. They are suitable for the production of coatings, for example for purposes of surface treatment, which are intended to have a good electric conductivity.

In this connection, the production of coatings on metal, ceramic material, glass and the like is contemplated.

Hardening takes place with or without pressure at ordinary temperatures or slightly elevated temperatures up to 100° C.

We have further found that the products obtained by this process or their solutions may be used especially advantageously as a permanent finish for shaped objects, such as fibers, threads, foils, films, ribbons, tubes, fleeces, felts, and woven or knitted fabrics, made of materials such as polyacrylic nitrile, polyesters, polyamides, cellulose esters, wool, cotton, spun rayon, and mixtures of such materials. They impart to these materials, which are of synthetic or natural origin and are hydrophobic in character, the property of not accumulating electric charges, that is an antistatic effect.

Since the above described products are readily water-soluble, but can be transformed into a water-insoluble form under mild conditions, it is easy to fix the antistatic properties imparted to the hydrophobic materials permanently, that is resistant to washing and solvents.

In addition, the products used in accordance with the invention may serve to fix pigments on the carrier material. Examples of such pigments or pigment dyes are white pigments such as titanium oxide, zinc sulfide, lithopone and the like. The latter may also be used as delutering agents for lustrous textile fibers. It has further been found that the treatment of hydrophobic fibers with the products according to the invention improves their dying properties with anionic dyes.

The fixing of the products according to the invention on the materials to be finished takes place under extremely mild conditions. In most cases it is sufficient to dry the treated textiles under drying conditions which are customary in the textile industry without making a subsequent heating to a higher temperature necessary. The process may also be performed with the aid of the customary drying apparatus. Under certain circumstances a heat treatment may be completely omitted because the fixation of the water-soluble compounds applied to the textile material may, if necessary, also be accomplished by prolonged storage at room temperature.

The finishing treatment of textiles and the like in accordance with the invention may be accomplished in the presence of other customary auxiliary agents or finishing agents. For example, the impregnating baths may also include wetting agents, softening agents and stiffening agents, such as polyvinyl acetate and dispersions of polymethyl acrylic acid esters or starch. Furthermore, pigment dyes, weighting agents, delustering agents and the like may be added to the baths, whereby they become substantially fixed on the substrates.

The deposition of the products according to the invention on the textile material to be finished is most advantageously accomplished in a padding machine from an aqueous solution. To this solution a sufficient amount of sodium hydroxide or alkali metal carbonate or alkali metal hydrocarbonate must be added so as to neutralize the amount of acid customarily added for stabilization of the products and to transform any halohydrin groups which may still be present in the product into epoxide groups. In other words, the required amount of alkali depends upon the type of product used.

In general, if sodium hydroxide is used as the alkali, a sufficient amount must be added so that the pH of the solution is about 10.5 to 11. If alkali metal carbonates or alkali metal hydrocarbonates are used, a sufficient amount must be added so that an equivalent amount of sodium hydroxide would result in a pH of about 11. However, the amount of acid-binding compound added to the solution is in no way critical. In most cases, if sodium hydroxide is used, adequate fixation of the product on the fiber is achieved when the pH of the solution is above 10. The possibility of also being able to use alkali metal hydrocarbonates as acid-binding agents is particularly important for providing mixtures of synthetic fibers and wool with an antistatic finish because the pH value of the solution barely rises about 7.5. The finishing treatment with the products according to the invention may, however, not only be carried out in a padding machine, but also by more extensive immersion of the solution in a jig, in an open vat, in a winch vat or a dying machine. The process may also be economically practiced under these conditions because the good stability of the baths make it possible to operate with a stationary bath and the solution which had been squeezed or centrifuged out of the impregnated material may be used over again. In this manner it is also possible to finish yarns economically.

In addition to the alkalies or alkali metal salts, other acid-binding agents such as ammonia triethanolamine and the like or organic bases may be used.

The finished materials may be dried in customary fashion. Subsequent heating after drying is in most cases not necessary. If, however, a treated fabric must be thermo-stabilized after drying, this may be done at the usual temperatures without deterioration of the antistatic effect. Also, the subsequent treatment in steam apparatus customarily used in textile printing plants leads to excellent fixation of the products in accordance with the invention on the fiber.

The following examples are given for the purpose of illustration to enable persons skilled in the art to better understand and practice the invention and are not intended to be limitative.

EXAMPLE I 300 g. polyglycol having a molecular weight of 1000 (0.3 mol) were melted in a round-bottom flask provided with a stirrer, reflux cooler and thermometer, and the molten melt was admixed with 6 g. boron trifluoride in the form of an approximately 20% ethereal solution, accompanied by stirring. The resulting mixture was then heated to about 70° C. while the reflux cooling device was shut off, whereby the major amount of the ether distilled off. Thereafter, with the reflux cooler in operation, 55 g. epichlorohydrin (0.6 mol) were added and the temperature was maintained for 30 minutes at 68 to 75° C. while constantly stirring. Thereafter, 44 g. dipropylene triamine were added to the raw polyglycol-bis-chlorohydrin ether thus formed, and the temperature was increased to 120 to 130° C. The reaction mixture was maintained at this temperature for about one hour. The mixture was then cooled to 90 to 95° C., 135 g. of water were stirred into it and it was then stirred for about 30 minutes at 90 to 95° C. until the pH of the reaction mixture dropped below 8.5. After cooling to about 60° C., 30 g. epichlorohydrin were added and the mixture was maintained at this temperature until the pH dropped to about 7 (50 to 60 minutes). The reaction product was diluted with water to a total weight of 600 g.

A viscous, yellow, water-miscible liquid was obtained which rapidly hardened upon addition of a small amount of sodium hydroxide at temperatures between 80 to 90° C.

EXAMPLE II 100 g. polyglycol having a molecular weight of 1000 (0.1 mol) were placed into a round bottom flask provided with a reflux cooler, thermometer and stirrer and were admixed with 2 g. boron trifluoride in the same manner as described in Example I. Thereafter, the mixture was heated to 70° C., 18.5 g. epichlorohydrin were added, and the resulting mixture was stirred for one hour at 68 to 75° C. 14.5 g. dipropylene triamine, 60 g. water and 12.5 g. 40% sodium hydroxide were then added to the reaction mixture which consisted essentially of the bis-clorohydrin ether of the polyglycol 1000 in addition to a small amount of monochlorohydrin ether. The mixture was then heated for 50 minutes at 90 to 100° C. At the end of this period the pH was about 9.4. Titration of a sample at this time showed that about 90% of the organically-bonded chlorine had been transformed into ionic chlorine. At this time, 82 g. of a raw bis-chlorohydrin ether of polyglycol 600, which had been obtained in the above described manner by the reaction of 2 mols epichlorohydrin with 1 mol polyglycol 600, were added and the mixture was stirred for about one and a half hours at the boiling point (about 100° C.) under reflux. At the end of this period the pH of the mixture had dropped to about 7.2. The reaction mixture had become very viscous. The pH of the mixture was then adjusted to 5.5 to 6 by adding about 7.5 g. 36% hydrochloric acid and water was added to bring the weight of the mixture up to 320 g. A viscous, but still flowing yellow liquid was obtained which was miscible with water in all ratios, and which hardened, accompanied by gelling, upon addition of sodium hydroxide at about 60° C.

EXAMPLE III 300 g. molten polyglycol 1500 (0.2 mol) were placed into a round bottom flask provided with a reflux cooler, thermometer and stirrer, and the molten mass was then admixed with 6 g. boron trifluoride in the same manner as described in Example I. Thereafter, 24 g. (0.26 mol) epichlorohydrin were added and the mixture was stirred for one hour at 68 to 75° C., 29 g. dipropylene triamine were then added to the reaction mixture which consisted primarily of the monochlorohydrin ether of polyglycol 1500 in addition to a small amount of the bis-chlorohydrin ether. The temperature was raised to 130 to 140° C. and the mixture was stirred for two hours under reflux. Thereafter, the temperature was reduced to about 90 to 95° C. and 104 g. 10% sodium hydroxide and 60 g. water were added. The resulting mixture was stirred for one hour at 90 to 95° C. At the end of this time at least 90% of the organically-bonded chlorine had been transformed into ionic chlorine. The temperature was then reduced to about 60° C. and 31.5 g. epichlorohydrin were added, accompanied by constant stirring. The mixture was stirred for about 2 hours at temperatures around 60° C. until the pH of the reaction mixture dropped to about 7.2. By adding a small amount of concentrated hydrochloric acid, the pH of the reaction product was adjusted to 5.5 to 6. Water was then added until a total weight of 600 g. was reached. A viscous, water-miscible liquid was obtained which hardened after adjustment to alkalinity.

EXAMPLE IV 290 g. (0.3 mol) of a reaction product of 1 mol ethylene chlorohydrin and 20 mols ethylene oxide were heated for 4 hours at 120° C. in a round bottom flask provided with a reflux cooler with 31 g. (about 0.3 mol) diethylene triamine, accompanied by stirring. Thereafter, the reaction mixture was cooled to about 60° C., 100 g. water and 55 g. epichlorohydrin were added and the mixture was stirred at 55 to 60° C. until the pH dropped to about 7 (one and a half to two hours). The viscous product thus obtained was adjusted to a pH of 6 with hydrochloric acid and was diluted with water to a total weight of 510 g. The solution gelatinized in the presence of an alkali.

EXAMPLE V 320 g. (about 0.2 mol) of the bis-glycidyl ether of polyglycol 1500, obtained by epoxidation of the corresponding bis-chlorohydrin ether by treatment with sodium aluminate, were placed into a round bottom flask provided with a stirrer, thermometer and reflux cooler. The diepoxide was melted, and 18 g. (0.3 mol) ethylene diamine and 15 cc. water were added thereto at about 80° C., accompanied by stirring. The resulting mixture was stirred for about 60 minutes at 80 to 90° C. Thereafter, 68 g. (about 0.2 mol) of the raw bis-chlorohydrin ether of triethylene glycol, obtained by reaction of one mol triethylene glycol with about 2 mols epichlorohydrin in the presence of boron trifluoride, were added and the mixture was stirred for an additional one and a half hours at 60 to 80° C. The reaction product thus obtained was then adjusted to pH of 5.5 to 6 with concentrated hydrochloric acid. A yellowish, viscous liquid was obtained which immediately gelled at 60 to 70° C. upon addition of sodium hydroxide.

EXAMPLE VI 300 g. polyglycol 1500 (about 0.2 mol) were reacted in the presence of 6 g. boron trifluoride with 40 g. epichlorohydrin, as described in Example I. 28 g. dipropylene triamine were added to the reaction product thus obtained, and the mixture was heated for about one and a half hours at 130 to 140° C. under reflux. The reaction product was then cooled to 50 to 60° C., 100 g. water were added and 60 g. of a liquid epoxide resin pre-condensate, which was obtained in a known manner by reaction of sodium phthalate with epichlorohydrin and had an epoxide oxygen content of 8.12%, that is an epoxide equivalent of about 197, were added. The mixture was stirred at 50 to 60° C. for additional 30 minutes. The reaction product was adjusted to a pH of 5 to 6 with concentrated hydrochloric acid, and diluted with water to a total weight of 600 g. A viscous to pasty product was obtained which formed a stable dispersion in water, the dispersion being hardenable with the aid of an alkali.

EXAMPLE VII 5.25 parts by weight boron trifluoride were slowly introduced at room temperature and accompanied by stirring into 260 parts by weight of a glycerin oxethylation product which was liquid at room temperature and had been obtained by oxethylation of 1 mol glycerin with 30 mol ethylene oxide. 28 parts by weight epichlorohydrin were then added to this mixture. The resulting mixture was then heated to 68 to 70° C., accompanied by stirring, and was maintained at this temperature for one hour. Thereafter, 20 parts by weight dipropylene triamine and 120 parts by weight water were added. The mixture thus obtained was stirred for about 20 minutes at the boiling point (100° C.) under reflux, 60 parts by weight 10% sodium hydroxide were added, and it was maintained at the boiling point for an additional hour. Thereafter, it was cooled to about 65° C., 14 parts by weight epichlorohydrin were added and the mixture was stirred for about one hour at 60 to 70° C. until the pH dropped to about 7 to 7.5. After adjusting the pH to 5.5 to 6 with about 14 g. 30% hydrochloric acid, the mixture was diluted with water to a total weight of 750 g. A honey colored, viscous, clear liquid was obtained which was miscible with water in any desired ratio and rapidly gelled at 50 to 60° C. upon addition of a small amount of sodium hydroxide.

EXAMPLE VIII 100 parts by weight polyglycol 1000 (0.1 mol) were melted in a vessel provided with a stirrer, thermometer and reflux cooler and the molten mass was admixed with two parts by weight boron trifluoride as described in Example I. 14 parts by weight epichlorohydrin (0.15 mol) were then added. After stirring the mixture for one hour at 68 to 72° C., 14 parts by weight triethylene tetramine and 70 parts by weight water were added and the mixture was heated under reflux for about 20 minutes. 25 parts by weight 40% sodium hydroxide were then added and the mixture was boiled for an additional 30 minutes. Thereafter, 82 parts by weight of a raw bischlorohydrin ether of polyglycol 600, obtained by treating 1 mol polyglycol 600 with 2 mols epichlorohydrin in the presence of boron trifluoride, were added. After stirring this mixture at the boiling point for one hour, 4.6 parts by weight epichlorohydrin were added. The reaction mixture was then stirred until the pH dropped to about 7 to 7.5. The pH was then adjusted to 5.5 to 6 with concentrated hydrochloric acid and water was added until a total weight of 300 parts by weight was reached. A faintly yellow, cloudy, viscous liquid was obtained which rapidly gelled at 50° C. upon addition of a small amount of sodium hydroxide.

EXAMPLE IX 180 kg. liquid polyglycol 600 were placed into a vessel provided with a heating and cooling device, a reflux cooler, a thermometer and a stirring device. 2.7 kg. tin tetrachloride were then allowed to flow slowly into the liquid at about 30° C., accompanied by stirring. The mixture was heated to 68 to 70° C. and 56 kg. epichlorohydrin were added rapidly, accompanied by constant stirring and cooling, if necessary, so that the temperature of the mixture remained between 68 to 70° C. The resutling mixture was then stirred for one hour at temperatures around 70° C. The total amount of raw polyglycol-bis-chlorohydrin ether thus obtained was about 239 kg. 80 kg. of the raw chlorohydrin ether were drawn off into another vessel provided with a thermometer, reflux cooler, heating and cooling device and stirrer and having a capacity of about 600 liters, where it was admixed with 13.2 g. dipropylene triamine, 50 kg. water and 28 kg. 40% sodium hydroxide, accompanied by stirring. Thereafter, the mixture was heated to the boiling point for 45 minutes under reflux. The remaining amount of raw chlorohydrin ether of polyglycol 600 in the first vessel was then added while stirring and then the resulting mixture was maintained at the boiling point for an additional 20 to 30 minutes after adding 30 kg. water. During this period the pH of the viscous reaction product dropped to about 7.2. The reaction mixture was then vigorously cooled while adjusting the pH to 5.5 to 6 by adding about 38 kg. 10% aqueous hydrochloric acid. About 500 kg. of a faintly yellow, slightly cloudy highly viscous liquid were obtained which rapidly gelled at about 40° C. upon adding sodium hydroxide to distinct alkaline reaction.

EXAMPLE X 30 parts by weight polyglycol 600 (0.5 mol) were placed into a round bottom flask provided with a stirrer, reflux cooler and thermometer, and were admixed with 1.5 parts by weight boron trifluoride in the form of a 20% ethereal solution and the mixture was stirred. With the reflux cooler shut off, the mixture was heated to about 70° C. whereby the major amount of the ether distilled off. Thereafter, with the reflux cooler turned on, 93 parts by weight epichlorohydrin (1 mol) were added and the temperature was maintained for two hours at 70 to 75° C., accompanied by constant stirring. The raw polyglycol bis-chlorohydrin ether formed thereby was then admixed with 60 parts by weight dipropylene triamine and 100 parts by weight ethyl alcohol. The resulting mixture was refluxed at the boiling point for four hours. After cooling to about 50° C., 60 parts by weight epichlorohydrin were added and the mixture was stirred until the pH of the reaction mixture dropped to between 6.8 to 7, as determined by dissolving a sample in water. The product thus obtained rapidly hardened upon addition of a small amount of aqueous or alcoholic sodium hydroxide, and heating. After adjusting the pH to between 5.5 and 6 with glacial acetic acid, the product could be freed from solvent by distillation under reduced pressure without loosing its water-solubility.

EXAMPLE XI 290 g. (0.3 mol) of the oxethylation product of ethylene chlorohydrin mentioned in Example IV were reacted with 40 g. (about 0.3 mol) dipropylene triamine at 120 to 130° C., accompanied by stirring, until at least 95% of the organically-bonded chlorine was transformed into ionic chlorine (about three hours). The reaction mixture was then cooled to about 50 to 60° C. Thereafter, the mixture was admixed with 490 g. (about 0.6 mol) of a raw bis-chlorohydrin ether of polyglycol 600 which had been obtained by treating 1 mol polyglycol 600 with 2 mol epichlorohydrin in the presence of boron trifluoride or tin tetrachloride and the resulting mixture was stirred at 50 to 60° C. for about one hour. A sample of the reaction mixture dissolved in water then showed a pH below 7. The product thus obtained rapidly hardened after addition of a small amount of concentrated sodium hydroxide.

EXAMPLE XII 180 kg. polyglycol 600 were reacted with 56 kg. epichlorohydrin in the presence of tin tetrachloride, as described in Example IX. After adding 13.2 kg. dipropylene triamine, 35 kg. 40% sodium hydroxide and 150 kg. water the mixture was refluxed at the boiling point for about 40 minutes. The pH of the viscous reaction mixture had dropped to 7.2 at the end of this period. The reaction mixture was then adjusted to a pH of about 5.5 with approximately 66 kg. of 10% hydrochloric acid. About 500 kg. of a cloudy, virtually colorless product were obtained which rapidly solidified into a gel at 40 to 50° C. upon being made alkaline.

The reaction may be carried out in analogous fashion, that is in a single reaction process, in all those cases where the bis-chlorohydrin ethers or their mixtures used for the formation of the polyalkoxylated polyamines and for the subsequent reactions are identical. In this procedure it is advantageous to select the ratio of the number of chlorine atoms and the number of amino-hydrogen atoms present in the reaction mixture such that it is about 4:5 to 7:5.

EXAMPLE XIII 80 parts by weight (0.1 mol) of raw bis-chlorohydrin ether of polyglycol 600 (polyethyleneoxide with an average molecular weight of 600) were introduced into a reaction vessel provided with a reflux cooler, a thermometer and a stirring device. Thereafter, 7 parts by weight of 25% aqueous ammonia solution (about 0.1 mol) and 50 parts by weight of water were added at 25 to 30° C. while stirring. Agitation was continued for 45 minutes at the same temperature. Thereafter, 14 parts by weight of 50% sodium hydroxide were added, and the resulting mixture was heated to a temperature of 90 to 95° C. within one hour. Stirring was continued for about one more hour at this temperature. After cooling of the reaction mixture to about 65° C., 5.7 parts by weight of epichlorohydrin (0.05 mol) were added and the mixture was stirred until a sample distinctly formed threads upon being pulled, and until the pH value of an aqueous solution of a sample dropped below 7.5. Thereafter, the pH value of the mixture was adjusted to about 5 with a small amount of formic acid. The viscous product thus obtained gelled after addition of a small amount of sodium hydroxide very rapidly upon heating to about 50° C.

EXAMPLE XIV 120 parts by weight (0.15 mol) of raw bis-chlorohydrin ether of polyglycol 600 (containing 10.8 parts by weight of organically bonded chlorine and 0.6 part by weight of ionic chlorine) were placed into a reaction vessel as described in Example I, were heated to about 70° C., and then 7 parts by weight of a 25% ammonia solution diluted with 95 parts by weight of water were allowed to flow into the vessel. Thereafter, the mixture was stirred for 10 minutes at 70° C. At this time 20 parts by weight of 50% aqueous sodium hydroxide were added. The temperature was increased to about 90° C. and the mixture was stirred until the pH value of an aqueous solution of the sample was below 7.5 and until the reaction product became so viscous that it clearly formed threads upon being pulled. Thereafter, the reaction was interrupted by adding a quantity of hydrochloric acid such that the pH value of an aqueous solution of a sample was below 5.5. After addition of alkali the product rapidly gelled upon heating it slightly.

EXAMPLE XV 120 parts by weight of bis-chlorohydrin ether (0.15 mol) of polyglycol 600 were placed into a reaction vessel provided with a stirring device, a thermometer, and a reflux cooler, and then 5.4 parts by weight of ammonium chloride (0.1 mol) dissolved in 15 parts of warm water and 8 parts by weight of a 50% aqueous solution of sodium hydroxide were added at 30° C., while stirring. After about 20 minutes of stirring, the temperature of the mixture was increased to 50° C. and 20 parts by weight of sodium hydroxide were stirred into it. The temperature of the mixture was then increased to about 90° C. and it was stirred until the pH value of an aqueous solution of a sample was below 7.5 and until the reaction product distinctly formed threads upon being pulled. The reaction was then interrupted by adjusting the pH value to a value of 5 to 5.5 with the aid of any desired acid. The viscous product thus obtained rapidly gelled upon being heated after addition of a small amount of sodium hydroxide.

EXAMPLE XVI 172 parts by weight (0.1 mol) of the tris-chlorohydrin ether of an oxethylated glycerin, prepared by subjecting about 30 mols of ethylene oxide to an addition reaction with 1 mol of glycerin, were placed into a reaction vessel provided with a stirring device, a thermometer, and a reflux cooler. After heating the contents of the reaction vessel to about 50 to 60° C., 7 parts by weight of a 25% ammonia solution (0.1 mol) diluted with 100 parts by weight of water, 14 parts by weight of 50% sodium hydroxide and 40 additional parts by weight of water were added in this order while stirring. Thereafter, the temperature was increased to 85 to 90° C., and the mixture was stirred until the pH value of an aqueous solution of a sample was about 7.2 and until the reaction product formed threads upon being pulled. Thereafter, the pH of the mixture was adjusted to a value of 5 to 5.5 with a small amount of formic acid, and then the mixture was diluted to about 300 parts by weight with about 40 parts by weight of water. The product thus obtained represents a viscous liquid which gelled soon after the addition of a small amount of sodium hydroxide.

EXAMPLE XVII 139 parts by weight of bis-chlorohydrin ether of polyglycol 600 (0.175 mol) were placed into a reaction vessel provided with a stirring device, a reflux cooler and a thermometer, and were then heated to about 70° C. Thereafter, 4.4 parts by weight of dipropylenetriamine (0.033 mol), 5.2 parts by weight of 25% ammonia (about 0.075 mol)—diluted with 115 parts by weight of water—and 16 parts by weight of 15% sodium hydroxide were added thereto in this order. Subsequently, the temperature of the mixture was increased to about 90° C. and it is stirred (about two hours) until the pH value of an aqueous solution of a sample dropped to 7.2 and the reaction product distinctly formed threads upon being pulled. After adjusting the pH to a value of about 5 to 5.5 and diluting the mixture to 300 parts by weight with about 20 parts by weight of water, a viscous liquid was obtained which gelled soon after addition of a small amount of sodium hydroxide.

EXAMPLE XVIII 1200 parts by weight of a raw bis-chlorohydrin ether of polyglycol 1000 (polyethyleneoxide with an average molecular weight of 1000) were placed into a closed, heatable reaction vessel provided with a thermometer and a stirring device and were admixed therein by stirring at 25° C. with 45 parts by weight of a 25% aqueous ammonia solution, 140 parts by weight of 50% aqueous sodium hydroxide and 1000 parts by weight of water. Thereafter, while continuously stirring, the mixture was heated to a temperature of 90 to 92° C. and was maintained at this temperature until a sample withdrawn therefrom distinctly formed threads upon being pulled. At that time, 30 parts by weight of 85% formic acid and 300 parts by weight of water were added while stirring. About 2.750 parts by weight of a viscous liquid were obtained which was miscible with water in any desired ratio and which, after addition of sodium hydroxide, readily gelled without heating.

EXAMPLE XIX 735 parts by weight of a chlorohydrin ether mixture of polyglycol 600, which consisted of about 70% of bis-chlorohydrin ether and 30% monochlorohydrin ether, were placed into a closed, heatable reaction vessel provided with a thermometer and a stirring device. Thereafter, 32.5 parts by weight of a 25% aqueous ammonia solution, 10 parts by weight of dipropylenetriamine, 100 parts by weight of aqueous sodium hydroxide, and 600 parts by weight of water were added thereto by stirring at about 30° C. Thereafter, the mixture was heated to 90° C. and was stirred at this temperature until after about 8 hours, a sample of the reaction product readily gelled at room temperature after addition of a small amount of sodium hydroxide. At this point, the crosslinking reaction was interrupted by adding 50 parts by weight of 35% hydrochloric acid. A viscous liquid was obtained which was miscible with water in any desired ratio.

EXAMPLE XX 800 parts by weight of bis-chlorohydrin ether of polyglycol 600 were admixed by stirring at about 25° C. with 34 parts of a 25% aqueous ammonia solution, 6.3 parts by weight of ethylene diamine, 100 parts by weight of 50% sodium hydroxide and 650 parts by weight of water. Thereafter, the mixture thus obtained was heated to 90° C. and was stirred at this temperature for about 3 hours until a sample of the reaction product distinctly formed threads upon being pulled, and readily gelled at room temperature after addition of sodium hydroxide. At this point 25 parts by weight of 85% formic acid and 110 parts by weight of water were added. A viscous liquid was obtained which was miscible with water in any desired ratio.

EXAMPLE XXI 800 parts by weight of bis-chlorohydrin ether of polyglycol 1000 were admixed with 34 parts by weight of 25% ammonia, 6.3 parts by weight of ethylenediamine, 100 parts by weight of sodium hydroxide, and 500 parts by weight of water were admixed at 25° C. in a closed, heatable reaction vessel provided with a thermometer and a stirring device, and the resulting mixture was heated to 90° C. and stirred at this temperature until the total amount of organically bonded chlorine was transformed into ionogenic chlorine. 165 parts by weight of bis-chlorohydrin ether of polyglycol 300 were added to the reaction product obtained thereby and the mixture was stirred at about 80 to 90° C. until a sample of the reaction product distinctly formed threads upon being pulled and, after addition of sodium hydroxide, readily gelled at room temperature. At this time, 25 parts by weight of 85% formic acid and 100 parts by weight of water were added thereto. A viscous liquid which was miscible with water in any desired ratio was obtained thereby.

EXAMPLE XXII

A product which had been obtained in accordance with Example I by reaction of the raw bis-chlorohydrin ether of a polyglycol having a molecular weight of 1000 with dipropylene triamine and subsequent reaction of the polyglycol polyamine thus obtained with epichlorohydrin and which contained about 50% polyglycol 1000, was dissolved in a sufficient amount of cold water so that the impregnating bath contained 100 g./liter of the product. Thereafter, the bath was adjusted to a pH of about 11 with sodium hydroxide. Finally, 1 g./liter of a commercial non-ionic wetting agent was added. A polyester fabric (Trevira-taffeta) was impregnated with this solution in a padding machine, the impregnated farbric was squeeze-dried to a solution content of 30%, calculated on the basis of the air-dry weight of the fabric, and the fabric was then dried in customary fashion, that is either for 5 minutes at 100° C. or for 1 to 2 minutes at 140 to 150° C. The finished fabric did not become electrically charged upon rubbing. It retained this property even after 30 to 40 household washings with any desired washing agent at 40 to 60° C.

EXAMPLE XXIII

A 10% solution of the product obtained in accordance with Example IV, which had been adjusted to a pH of 9.8 to 10 with soda, the product having been obtained by reaction of oxethylated ethylene chlorohydrin with diethylene triamine and reaction of the polyglycol polyamine thus obtained with epichlorohydrin, was used to treat a polyamide fabric in a padding machine. The treated fabric was then squeeze-dried to a solution content of 40 to 50%, and was thorouhgly dried at the customary temperatures on a flat frame. Even after numerous household washings the fabric did not show any residual electric charge after rubbing.

EXAMPLE XXIV

A polyamide fabric (perlon) was treated in a padding machine with 7% solution of the product obtained in accordance with Example VII, the product having been obtained by reaction of the chlorohydrin ether of oxethylated glycerin with dipropylene triamine and subsequent reaction of the reaction product with epichlorohydrin. Prior to the impregnation, 3 ml./liter of 40% sodium hydroxide and 20 gm./liter of about 50% polyvinyl acetate dispersion were added to the solution. The treated fabric was squeeze-dried to a solution content of about 50% and was then dried for 2 minutes at 130 to 140° C. The finished fabric exhibited a stiffening effect and even after several household washings did not show any permanent electric charge.

EXAMPLE XXV

An aqueous solution was placed into a padding machine, the solution containing 120 gm./liter of the product according to Example IX, the product having been obtained by reaction of the bis-chlorohydrin ether of polyglycol 600 with dipropylene triamine and subsequent reaction of the reaction product with additional bis-chlorohydrin ether of polyglycol 600, 8 g./liter sodium carbonate, 1 g./liter of a pigment dispersion (for example 1 gm. Helizarine yellow) and 5 g./liter zinc sulfide and 2 g./liter of a non-ionic wetting agent. An unfixed drapery fabric of polyester material (diolen) was impregnated with this solution, the impregnated fabric was squeeze-dried to a solution content of about 30%, dried at 80 to 120° C. and subsequently heat-fixed in customary fashion by heating for 20 to 30 seconds at 180 to 190° C. The finished drapery material had good wash-resistant properties. The pigment dye, the dilustering effect and the antistatic properties were retained by the fabric even after frequent washings.

EXAMPLE XXVI

A mixed fabric made of wool and polyacrylic nitrile cut fibers (dralon) with a dralon-content of 55% was treated in a padding machine with an aqueous solution containing 60 g./liter of a product according to Example XII, the product having been obtained by reaction of 3 mol bis-chlorohydrin ether of polyglycol 600 with 1 mol dipropylene triamine in the presence of water and sodium hydroxide, 6 g./liter sodium acid carbonate, 1 g./liter of a non-ionic wetting agent and 5 g./liter of a cationic softener. The finished fabric possessed a flowing, soft feel and very good antistatic property. After 20 washings with a fine quality washing agent at 40° C., the electric charge of the fabric after rubbing on glass—measured under defined conditions—was 40 volts with a field collapse period of less than 0.5 seconds. The same fabric without the antistatic finishing and under identical conditions exhibited an electric charge of about 150 volts and a field collapse period of above 3 minutes.

EXAMPLE XXVII

A pad yarn made of polyacrylic nitrile material in the form of a strand was immersed for a short period of time into an aqueous solution which contained 100 g./liter of the product obtained in accordance with Example XII, 7 g./liter sodium carbonate and 10 g./liter of a cationic softening agent, the impregnated fabric was drip-dried, centrifuged to a solution content of 30 to 35% and thoroughly dried at 80 to 100° C. A yarn material with a satisfactory feel was obtained which could be satisfactorily used for making knitted fabrics. The knitted goods made from this yarn exhibited good antistatic properties even after numerous washings with the customary household washing agents.

EXAMPLE XXVIII

In this example, the following components were used:

| | G. |
|---|---|
| Polyethylene glycol 600 | 1440 |
| Tin tetrachloride | 18 |
| Epichlorohydrin | 452 |
| Dipropylenetriamine | 106 |
| 50% caustic soda solution | 177 |
| Formic acid | 60 |
| Water, ca. | 2100 |

*Procedure.*—The polyethylene glycol 600 was weighed into the reaction vessel at 35 to 40° C. Then the tin tetrachloride was added with agitation and the mixture was heated to 68 to 70° C. The epichlorohydrin was then added, over a period of 45 minutes, with cooling to maintain the temperature between 68 to 74° C., and the mixture was held at 68 to 74° C. for an additional 30 minutes. Then, in succession, the dipropylenetriamine, caustic soda and water were added and the mixture was heated to 85 to 87° C., not to exceed 90° C. Sampling was done every five minutes by running pH on a 1% solution. When the pH fell to 7.5, the viscosity was determined. At a viscosity of 6 to 7 seconds, the mixture was cooled to 80° C. At a viscosity of 16 to 18 seconds, the formic acid was added and the pH adjusted to 5.0 to 5.5 then the reaction mass was cooled to 50° C.

EXAMPLE XXIX

The following components were used in this example:

| | G. |
|---|---|
| Polyethylene glycol 600 | 1270 |
| Tin tetrachloride | 14 |
| Cocoamine | 70 |
| 50% caustic soda | 190.5 |
| Epichlorohydrin | 397 |
| Dipropylenetriamine | 94 |
| Water | 1797 |
| Formic acid (85%) | 56 |

*Procedure.*—The polyethylene glycol 600 was weighed into the reaction vessel at 35 to 40° C. Then the tin tetrachloride was added with agitation and the mixture was heated to 68 to 70° C. The epichlorohydrin was then added over a period of 45 minutes with cooling to maintain the temperature between 68 to 74° C., and the mixture was held at 68 to 74° C., for an additional 30 minutes. Then, all of the cocoamine and 74 g. of the caustic soda were added, the reaction was heated to 95 to 100° C. and stirred for 30 minutes, then cooled to 90° C. (in about 10 minutes). After this, the dipropylenetriamine, then water, and finally the balance of the caustic soda were added. The reaction mixture was then heated to 90° C., pH and viscosity control were as in Example XIX. When the viscosity reached 6 to 8 seconds, the temperature was lowered to 82 to 84° C. Viscosity testing was continued until 23 to 25 seconds was reached. The reaction was stopped at this point by adding the formic acid bringing the pH to between 5.0 and 5.5.

While we have set forth specific embodiments and pre-

We claim:

1. A process for the preparation of hardenable water-soluble synthetic resinous products containing halohydrin groups which comprises reacting at a temperature from 50 to 100° C. (A) a member selected from the group consisting of polyamines, aqueous ammonia and mixtures thereof with (B) a polylower alkylene oxide derivative having 3 to 70 alkylene oxide units and having more than one halohydrin group in the molecule, the molar ratio of A to B being selected so that the number of halohydrin groups to the number of reactive hydrogen atoms attached to a nitrogen atom is 4:5 to 7:5 in the presence of acid binding agents selected from the group consisting of alkali metal hydroxides, alkali metal carbonates and alkali metal bicarbonates, and alkaline earth metal carbonates, continuing said reaction until the reaction mixture reached a pH of between 7 to 7.5, and thereafter discontinuing said reaction by acidification to a pH of less than 6, whereby stabilized, incompletely condensed, water-soluble resins are obtained which are readily hardenable in an alkaline medium.

2. An incompletely condensed synthetic resin readily hardenable in alkaline medium as produced by the process of claim 1.

3. A finishing process for producing antistatic properties on synthetic organic materials having low electrical conductivity which comprises treating said materials with an aqueous alkaline solution of an incompletely condensed, readily hardenable water-soluble synthetic resin produced by the process of claim 1.

4. The process of claim 3 wherein the organic synthetic material is dried at elevated temperature up to 190° C.

5. The process of claim 3 wherein the organic synthetic material is a textile comprising an organic synthetic material.

6. The process of claim 3 wherein the aqueous alkaline solution for treating said organic synthetic material is made alkaline with a compound selected from the group consisting of alkali metal hydroxides, alkali metal carbonates, alkali metal bicarbonates, ammonia and organic bases.

References Cited
UNITED STATES PATENTS

| | | | |
|---|---|---|---|
| 2,849,411 | 8/1958 | Lehmann et al. | 260—29.2 |
| 2,938,004 | 5/1960 | De Hoff et al. | 260—47 |
| 3,021,232 | 2/1962 | Pretka | 260—47 |

WILLIAM H. SHORT, *Primary Examiner.*

T. PERTILLA, *Assistant Examiner.*